United States Patent Office 3,544,645
Patented Dec. 1, 1970

3,544,645
XYLENE ISOMER SEPARATION
Charanjit Rai, Somerset, Mohamed M. El-Mogazi, Hightstown, and Jay A. Rashkin, New Brunswick, N.J., assignors to Cities Service Oil Company, Tulsa, Okla., a corporation of Delaware
No Drawing. Filed Jan. 3, 1969, Ser. No. 788,945
Int. Cl. C07c 7/14
U.S. Cl. 260—674      10 Claims

ABSTRACT OF THE DISCLOSURE

In the separation of para-xylene from mixtures consisting predominantly of meta- and para-xylene isomers by fractional crystallization, small amounts of free radicals are introduced into the xylene mixture to lower the eutectic point of the mixture and improve recovery of para-xylene therefrom. The amount of free radicals present in the xylene mixture is between about 0.001 and about 4.0 mole percent. Free radicals are preferably formed in situ by adding free radical initiators such as peroxides, especially inorganic peroxides, prior to separation of para-xylene crystals from mother liquor.

---

Large quantities of hydrocarbon mixtures consisting predominantly of xylene isomers are produced commercially. Such mixtures are, for instance, recovered by fractionation of coke oven distillates and catalytically reformed naphtha. Recovery of para-xylene from mixtures of xylene isomers is particularly difficult due to the closely related boiling points of the para- and meta-isomers. Numerous processes have been proposed for effecting separation of xylene isomers, particularly the recovery of para-xylene from such mixtures. Among the most successful commercially have been processes based upon fractional crystallization effected by cooling the xylene mixture to crystallize the para-xylene. In the several known processes for fractional crystallization of para-xylene, the efficiency of the process is ultimately limited by the phase equilibria conditions and especially the eutectic point of the particular xylene mixture from which crystals are obtained.

It has now been found that the presence of small quantities of free radicals in mixtures of xylene isomers acts to lower the effective eutectic freezing point of the mixtures. This increases the yield of para-xylene obtainable from such mixtures by fractional crystallization processes and allows such processes to be carried out at temperatures below the normal eutectic point of the mixture of meta-xylene and para-xylene being treated.

Mixtures of xylene isomers treated for recovery of para-xylene in accordance with this invention may be obtained from any suitable source and contain essentially meta- and para-xylene isomers with usually no more than about 5 vol. percent, preferably no more than about 1 vol. percent, of other materials being present. For instance, the invention is applicable in recovery of para-xylene from mixtures consisting essentially of para-xylene and meta-xylene or from mixtures of para-xylene and meta-xylene with small amounts of ethylbenzene and ortho-xylene. A typical $C_8$ aromatics fraction recovered by fractionation or extraction from catalytically reformed naphtha may, for example, contain between about 10 and about 25 volume percent (vol. percent) ethylbenzene (boiling point 277° F.), between about 15 and about 25 vol. percent para-xylene (boiling point 281° F.), between about 35 and about 50 vol. percent meta-xylene (boiling point 282° F.) and between about 15 and about 25 vol. percent ortho-xylene (boiling point 292° F.). Commercial processes are available for recovery by conventional fractionation of ethylbenzene and ortho-xylene so that these isomers may be removed from the mixture in whole or in part before the recovery of para-xylene by fractional crystallization. A typical ethylbenzene fractionating column requires 350–400 trays and a very high reflux ratio, and an ortho-xylene tower has 125–150 trays and a fairly high reflux ratio. The close boiling points of meta- and para-xylene make it virtually impossible to separate these two isomers by distillation. An 800 tray fractionating column would be required to completely separate meta- and para-xylene and would be prohibitively expensive. On the other hand, because of the wide differences in the freezing points between the meta- and para-isomers (−53° F. for meta-xylene and +56° F. for para-xylene), technology has been developed to separate para-xylene by crystallization. In the recovery of para-xylene from a mixture of meta- and para-isomers, the temperature of crystallization is usually limited to no lower than 2 to 5° F. above the freezing point of the eutectic mixture. At the eutectic freezing point (−63° F.), the mother liquor contains 84% meta-xylene and 16% para-xylene.

To be effective in reducing the eutectic point of mixtures of meta- and para-xylene and increasing recovery of para-xylene in accordance with the invention, free radicals should be present in the xylene mixture prior to recovery of para-xylene crystals therefrom in amounts between about 0.001 and about 4.0 mole percent based on the mixture of xylene isomers, preferably between about 0.01 and 1.0 mole percent. The free radicals may may be introduced into the mixture by any suitable means such as by addition of free radicals to the mixture prior to cooling, by direct addition to the crystallization zone, or preferably by formation in situ.

Free radicals formed in situ as mentioned above may be formed by addition of suitable free radical initiators to the xylene mixture prior to separation of para-xylene crystals therefrom. Free radical initiators are preferably soluble in the xylene mixture and may be added prior to cooling of the xylene mixture or may be added to the mixture at crystallization temperature, especially in a continuous process. Peroxides, especially inorganic peroxides, are preferred free radical initiators. Suitable organic peroxides include, for instance: alkyl hydroperoxides, such as t-butyl hydroperoxide or cumene hydroperoxide; dialkyl peroxides, such as di-t-butyl peroxide or lauroyl peroxide; aryl peroxides, such as benzoyl peroxide; peroxy acids, such as perbenzoic acid or p-chlorobenzoic acid; and peroxy esters such as t-butyl peroxybenzoate or diethyl diperoxyterephthalate. Suitable inorganic peroxides include, for instance, hydrogen peroxide, ozone or deuterium peroxide, with hydrogen peroxide being preferred.

By introducing free radicals into a meta-para-xylene mixture as described above, the eutectic freezing point of the mixture may be lowered from the normal eutectic point of −63° F. to as low as about −110° F.

The benefits of this invention are obtained by recovering para-xylene crystals from mixtures of xylenes at temperatures below the normal eutectic points of such mixtures. Temperatures between about −70 and about −110° F., preferably between about −90 and −110° F., are suitable for this purpose. The amount of para-xylene recovered from a given mixture of xylenes by a given crystallization technique may frequently be increased by as much as 100% or more by the use of free radicals in accordance with this invention.

Conventional processes for recovery of para-xylene by fractional crystallization may include one or more stages of crystallization, crystal washing and other known techniques for obtaining maximum recovery of para-xylene crystals of maximum purity. It should be understood that all such techniques are equally applicable when practicing the present invention and that the benefits of the invention are obtained in addition to, not in place of, benefits obtained by such techniques.

EXAMPLE 1

In order to demonstrate the advantages of the present invention in recovery of para-xylene from mixtures of xylene isomers and especially the effect of free radicals in reducing the eutectic point of xylene mixtures, an experiment was carried out directed toward the separation of additional para-xylene from a mixture of meta-xylene and para-xylene containing 16 vol. percent para-xylene and 84 vol. percent meta-xylene. This mixture represented the mother liquor from conventional recovery of para-xylene by fractional crystallization at the normal eutectic freezing temperature of this mixture at −63° F. and contained, in addition to the meta- and para-xylene, about 0.5 vol. percent toluene and ethyl benzene. An attempt was made to recover additional para-xylene from this eutectic mixture by lowering the temperature to about −100° F. with and without free radicals in the following manner.

100 milliliters of the eutectic mixture described immediately above were placed in a 200 milliliter tall beaker together with 0.24 gram of hydrogen peroxide. The beaker was fitted with a rubber stopper wrapped in aluminum foil. A thermometer and metal wire stirrer were fitted through the stopper. The stirred mixture was cooled in a Dewar flask which contained a Dry Ice-acetone mixture with the desired crystallization temperature being maintained at about −100° F. for one hour. The hydrogen peroxide dissociated to produce free radicals. At the end of the run, the stirring was stopped and the crystals were separated from the filtrate. Both filtrate and crystals were weighed after warming to room temperature. The percentage of para-xylene in the crystals and the filtrate was analyzed by infrared spectrographic techniques and the percentage of para-xylene recovered was calculated by using the analytical data on the crystals and the filtrate fractions. The results of this run as well as the result of the control run in which free radicals were not used is reported in Table I below:

TABLE I.—RECOVERY OF PARA-XYLENE FROM MIXTURE OF PARA-XYLENE AND META-XYLENE

| Additive | Wt. percent para-xylene | | Para-xylene recovered, wt. percent |
|---|---|---|---|
| | Crystals | Filtrate | |
| None | | | [1] 0 |
| Hydrogen peroxide | 53.1 | 6.0 | 71 |

[1] No separation due to complete freezing of eutectic mixture.

It can be seen from the above data that addition of free radicals to the xylene mixture resulted in an effective lowering of the eutectic point of the mixture to below −100° F. and allowed recovery of substantial additional quantities of para-xylene which would not normally be recoverable at that temperature.

EXAMPLE 2

For this example, a typical mixture of 75 vol. percent meta-xylene and 25 vol. percent para-xylene is treated for crystallization of para-xylene therefrom by a conventional fractional crystallization process at a temperature of −61° F. Ultimate recovery of para-xylene is only about 9 wt. percent based on total feed. By contrast, when the same crystallization process is operated with the addition of hydrogen peroxide to the xylene mixture in accordance with the present invention, as Example 1 above, ultimate recovery of para-xylene is about 18 wt. percent based on total feed.

While the invention has been described above with respect to preferred embodiments thereof, it will be appreciated by those skilled in the art that various changes and modifications may be made without departing from the spirit and scope of the invention and it is intended to cover all such changes and modifications in the appended claims.

We claim:
1. In a process for the separation of para-xylene from a hydrocarbon mixture consisting predominantly of meta- and para-xylene isomers in which such mixture is cooled to thereby crystallize para-xylene and para-xylene crystals are separated from the mother liquor, the improvement which comprises separating para-xylene crystals from mother liquor in the presence of free radicals.

2. The process of claim 1 in which the hydrocarbon mixture contains at least about 95 vol. percent meta- and para-xylene.

3. The process of claim 2 in which the mixture is cooled to below the normal eutectic point of such mixture prior to separation of para-xylene crystals from the mother liquor.

4. The process of claim 3 in which the mixture is cooled to between about −70° and about −110° F. before separation of para-xylene crystals therefrom.

5. The process of claim 4 in which free radicals are present in amounts between about 0.001 and about 4.0 mole percent based on the mixture of xylene isomers.

6. The process of claim 5 in which the free radicals are formed in situ.

7. The process of claim 6 in which the free radicals are formed by adding peroxide to the mixture before separation of para-xylene crystals from mother liquor.

8. The process of claim 7 in which the peroxide in inorganic peroxide.

9. The process of claim 8 in which the peroxide is hydrogen peroxide.

10. The process of claim 8 in which the peroxide is ozone.

References Cited

UNITED STATES PATENTS 3,414,630  12/1968  Szawlowski et al. ____ 260—674

DELBERT E. GANTZ, Primary Examiner

C. R. DAVIS, Assistant Examiner